United States Patent [19]

Haferl

[11] 3,736,378

[45] May 29, 1973

[54] VIDEO SIGNAL PROCESSING STAGE WHICH PERFORMS PLURAL FUNCTIONS

[75] Inventor: Peter Eduard Haferl, Adliswil, Switzerland

[73] Assignee: RCA Corporation, New York, N.Y.

[22] Filed: Apr. 24, 1972

[21] Appl. No.: 246,652

[52] U.S. Cl. ............................178/7.3 S, 178/7.3 DC

[51] Int. Cl. .........H04n 5/52, H04n 5/08, H04n 5/10

[58] Field of Search ......................178/7.3 S, 7.3 DC, 178/7.3 R, 7.5 S, 7.5 DC, 7.5 R

[56] References Cited

UNITED STATES PATENTS

| | | | |
|---|---|---|---|
| 3,432,615 | 3/1969 | Stamatis | 178/7.3 DC |
| 3,632,872 | 1/1972 | Ridley | 178/7.5 S |

*Primary Examiner*—Robert L. Richardson
*Attorney*—Eugene M. Whitacre

[57] ABSTRACT

A signal processing stage for a television receiver which performs the combined functions of video demodulation, automatic gain control voltage generation, horizontal synchronizing pulse separation, and vertical synchronizing pulse separation in a single circuit.

7 Claims, 2 Drawing Figures

VIDEO SIGNAL PROCESSING STAGE WHICH PERFORMS PLURAL FUNCTIONS

BACKGROUND OF THE INVENTION

This invention relates to a signal processing stage useful in monochrome and color television receivers to combinedly perform, in a single circuit construction, functions which are commonly performed in separate, individual circuits. In particular, the functions performed include video demodulation, automatic gain control voltage generation, horizontal synchronizing pulse separation, and vertical synchronizing pulse separation.

SUMMARY OF THE INVENTION

As will become clear hereinafter, the signal processing stage of the invention is constructed by taking into account the mutual dependency that exists between the amplitude of the synchronizing pulses in the receiver and the automatic gain control voltage developed and, also, the fact that the amplitudes of the black level and gain control voltages at the video demodulator are substantially equal. Also taken into account is the negative modulation of the television signal present at the video demodulator, where the synchronizing pulses form the peak amplitudes of the intermediate frequency envelope and enable separation of the horizontal synchronizing pulses and the obtaining of the automatic gain control voltage. Sequential keying at the video demodulator is also employed, so that the negative excursions of the envelope can be used to supply the video signal while the positive excursions can be used to supply the horizontal synchronizing pulses. Vertical synchronizing pulses, in addition, can be derived using both polarities of this demodulated signal.

Applying these characteristics permit the video demodulator to be of keyed construction—a sequencing transistor is used to alternate, in effect, the polarity of the demodulator and the connected load. As will be seen, such alternation permits the video signal, the horizontal and vertical synchronizing pulses, and the automatic gain control voltage to be developed at different points in the circuit, each of which are isolated from one another. The output signal quality as regards noise, interference, and stability of black level exhibits a substantial improvement over that obtained when individual circuits are employed to provide these varied functions.

BRIEF DESCRIPTION OF THE DRAWINGS

These and other features of the invention will be more clearly understood from a consideration of the following description taken in connection with the accompanying drawings in which.

DETAILED DESCRIPTION OF THE DRAWINGS

Figure 1:
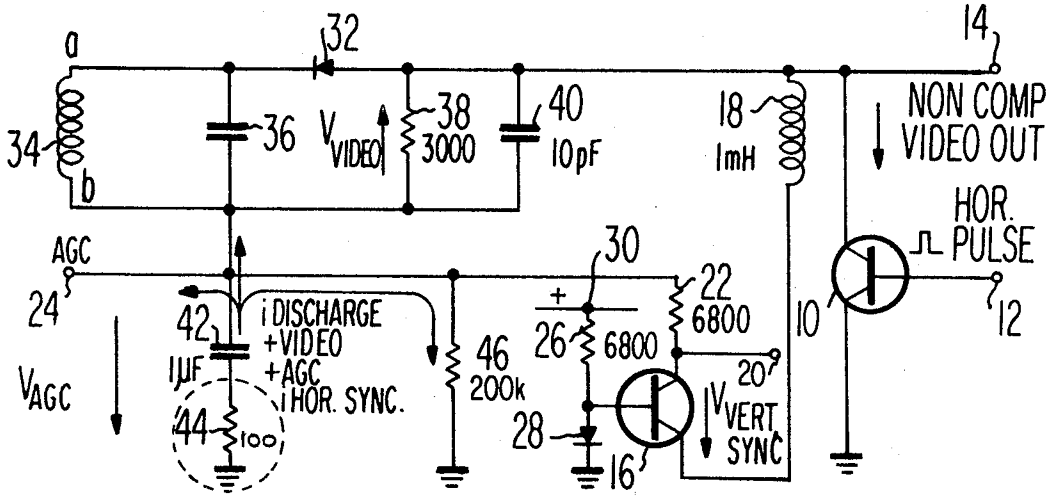
FIG. 1 is a schematic circuit diagram of a signal processing stage constructed in accordance with the present invention.

In FIG. 1, two transistors, two semiconductor rectifiers, five resistors and three capacitors are shown. The first transistor 10 has an emitter electrode coupled to a point of reference or ground potential, a base electrode coupled to an input terminal 12 and a collector electrode coupled to an output terminal 14. The second transistor 16 has an emitter electrode coupled to the output terminal 14 by an inductor 18, a base electrode coupled as described below, and a collector electrode coupled, on the one hand, to an output terminal 20 and, on the other hand, by the first resistor 22 to a further output terminal 24. As shown, the base electrode of transistor 16 is connected to the junction between the second resistor 26 and the anode electrode of the first semiconductor rectifier 28, the resistor 26 and rectifier 28 being serially coupled between a source of operating potential 30 and the reference or ground potential point.

The anode electrode of the second semiconductor rectifier 32 is connected to output terminal 14, while its cathode electrode is coupled to terminal *a* of a transformer winding 34, across which the first capacitor 36 is connected in parallel. Coupled to the second transformer terminal *b* is one end of the third resistor 38, the other end of which is connected to the anode electrode of rectifier 32, with the second capacitor 40 being coupled across this resistor 38.

The third capacitor 42 on the other hand, is coupled together with the fourth resistor 44 in series between output terminal 24 and the ground potential point, while the fifth resistor 46 is coupled between output terminal 24 and ground. To complete the circuit construction, terminal *b* of transformer winding 34 is direct current connected to output terminal 24. As will be seen below, a non-composite video signal which is blanked during the horizontal pulse interval—and which is clamped to ground—is developed at output terminal 14. An automatic gain control voltage is developed at output terminal 24 while vertical synchronizing pulses are derived at output terminal 20. The horizontal synchronizing component is separated by capacitor 42 in response to horizontal keying pulses applied at input terminal 12.

In particular, the video demodulator for the television receiver comprises transformer winding 34 (when that winding represents the secondary of the picture intermediate frequency output transformer), rectifier 32, load resistor 38 and load capacitor 40. Such circuit arrangement has been selected for the sake of simplicity but, as will be readily apparent, any other circuit arrangement can be used if the DC equivalent circuit is of the form in FIG. 1.

Figure 2:
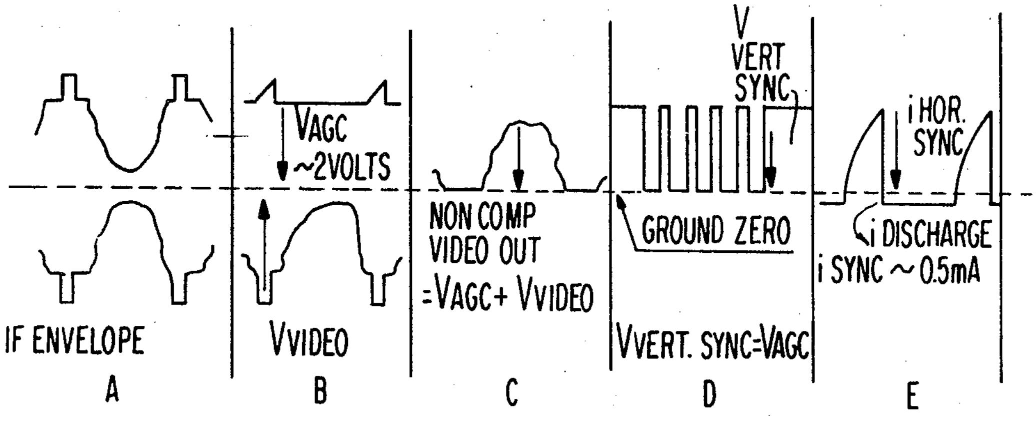
FIG. 2 are signal waveforms helpful in an understanding of the operation of the FIG. 1 circuit.

In operation—and first assuming that transistor 10 and inductor 18 are omitted—, it will be appreciated that rectifier 32 will demodulate the negative-going portions of the intermediate frequency signal envelope in accordance with its forward conducting characteristics. FIG. 2B illustrates the video signal which will develop across the load resistor 38, capacitor 40 at this time. During horizontal blanking, however, transistor 10 is driven to saturation by the horizontal flyback pulses applied at terminal 12. The anode electrode of rectifier 32 is then coupled by transistor 10 to ground which, in turn, adds the series circuit of capacitor 42 and resistor 44 as part of the demodulator. More particularly, capacitor 42 and resistor 44 are placed essentially in parallel with load resistor 38 and capacitor 40—and with the component values illustrated, the essential load of the demodulator becomes provided by capacitor 42, resistor 44, as their effective exhibited impedance is substantially smaller than that exhibited by load resistor 38 and capacitor 40 connected in parallel.

This coupling of the anode electrode of rectifier 32 to ground during horizontal blanking then permits the demodulator to detect the positive-going portions of the intermediate frequency signal envelope essentially at the cathode electrode of rectifier 32. The horizontal synchronizing pulses cause a current to flow from ground through transistor 10, rectifier 32, capacitor 36, capacitor 42 and resistor 44 to charge capacitor 42 to the voltage $V_{AGC}$ in FIG. 2B. The keying will thus be seen to, in effect, reverse the polarity of the demodulator rectifier 32 in that the output signal will be developed at the cathode electrode of rectifier 32 during the horizontal synchronizing interval while during the active line interval, the output signal will be developed at the anode electrode of rectifier 32. Resistor 44, in this respect, determines the time constant of the charge operation such that the pedestal of the voltage signal $V_{AGC}$ is substantially equal to the black level amplitude of the intermediate frequency envelope. Resistor 46 serves to discharge capacitor 42, with each synchronizing pulse then serving to replenish the charge across capacitor 42 to produce a charge current of the form shown in FIG. 2E. During the active line interval, transistor 10 is cutoff and no return current path to ground exists—-therefore, rectifier 32 and transistor 10 cooperate to alternatively detect the video signal at output terminal 14 and the horizontal synchronizing pulse component at output terminal 24.

It will be seen that the detected horizontal synchronizing voltage $V_{AGC}$ is composed of demodulated and stored horizontal synchronizing pulses—it can then be used for automatic gain control. This automatic gain control voltage includes all the characteristics of conventional keyed circuit operation, together with the further advantage of being independent of flyback pulse amplitude. Thus, the automatic gain control voltage solely depends on horizontal synchronizing pulse amplitude, and permits a fixed setting of a threshold voltage. Adding both voltage signals shown in FIG. 2B produces a zero signal resultant during the horizontal synchronizing pulse interval, whereas the humps on the automatic gain control voltage results from the inclusion of resistor 44 to adjust the time constant for charging capacitor 42. This time constant should be such that the re-charging of capacitor 42 occurs during the total length of a horizontal synchronizing pulse. With the values shown, it will be in the order of 20–100 microseconds, and thereby improves the signal-to-noise ratio of the automatic gain control voltage with a DC level which is equal in amplitude but opposite in polarity to the black level of the video signal illustrated.

As will be seen, the voltage across capacitor 42 serves as a bias voltage for the video demodulator. Sample and hold techniques are employed in generating the voltage across this capacitor, with the sampling being performed by the keying of transistor 10. The value of the positive DC voltage developed across capacitor 42 is that of the negative value of the black level of the video signal when capacitor 42 is short circuited to ground (FIG. 2B). This DC voltage across capacitor 42 can be used as an automatic gain control voltage because it represents the synchronizing pulse amplitude. Stabilization of the voltage across capacitor 42 is achieved by the AGC feedback loop.

With the circuit in operation, the voltages $V_{AGC}$ and $V_{VIDEO}$ are added together to provide an output signal measured with respect to ground at terminal 14 of the form illustrated in FIG. 2C. Adding the two signals together produces an output video signal of which the black level is always at ground potential independent of the antenna input voltage; this follows because any change in the black level of $V_{VIDEO}$ will be accompanied by a proportional change in the black level of $V_{AGC}$. As the black level of the output video signal is at ground potential during the horizontal blanking interval, transistor 10 clamps such signal to ground at this time without otherwise affecting it. Use of this circuit in color television receivers, however, necessitates the narrowing of the horizontal pulse in order to avoid blanking the burst interval by the transistor 10. Circuit solutions for this are mentioned below. The function of the keying transistor 10 will thus be seen to be the polarity reversal of rectifier 32, interconnecting the automatic gain control circuit 42, 44 and blanking the video signal.

FIG. 2E shows that the horizontal synchronizing current—which is the charge current of capacitor 42—is of opposite direction to the discharge current. The discharge current is formed by the AGC and video load current through resistor 46. The fact that the synchronizing current is in one direction while the other currents are in the opposite direction is used in separating the horizontal synchronizing pulse. Instead of connecting capacitor 42 via resistor 44 to ground, capacitor 42 may be connected to a unidirectional current amplifier with an input impedance of approximately 100 ohms (such as a saturated amplifier), whereby the synchronizing current brings the amplifier out of saturation. Such technique for synchronization separation produces a high noise immunity because of the keyed operation which results. Any noise occuring during the active television line interval will not produce a current flow in capacitor 42 because the impedance at the collector of transistor 10 will be too high during its nonconductive state. Differentiation of the horizontal synchronizing signal to suppress the vertical synchronizing signal is not required because the vertical synchronizing system does not produce a significant charge current in capacitor 42. Horizontal synchronizing instabilities occurring during the vertical synchronizing period are thus eliminated and improved keyed horizontal synchronizing separation is obtained.

The vertical synchronizing separator transistor 16 is a common base stage biased by resistor 26 and rectifier 28 such that its emitter electrode is at ground potential. The collector electrode resistor 22 connects to the automatic gain control voltage terminal 24, which serves as the supply voltage for the vertical sync separator. Only negative-going signals at the collector electrode of transistor 10 key transistor 16 into operation, with such signals being the vertical synchronizing pulses. These pulses are coupled to the emitter electrode of transistor 16 via the inductor 18 and drive transistor 16 into saturation. The separated vertical synchronizing pulses then appearing at the collector electrode of transistor 16, have an amplitude of $V_{AGC}$, as illustrated in FIG. 2D.

The resulting vertical pulse current is coupled back to the demodulator circuit via the collector resistor 22 which, during the vertical synchronizing pulse interval, is the effective load resistor for the demodulator. In particular, it will be seen that resistor 22 is switched in parallel with capacitor 42 and resistor 44 by the vertical synchronizing pulses—and, due to the substantially unity current gain of transistor 16, most of the detected vertical synchronizing current flows through resistor 22 until transistor 16 is in saturation. When this occurs, the remaining vertical synchronizing current flows through resistor 26, the base-emitter diode of transistor 16, the inductor 18, and into capacitor 42. The value of resistor 22 is chosen such that no more than one-third of the total vertical synchronizing current flows through capacitor 42. The vertical synchronizing pulses are thus attenuated by more than 10dB at the horizontal pulse output. There will be no horizontal pulses developed at the vertical pulse output because the video signal is blanked during the horizontal pulse interval by the keying then of transistor 10. Even with very low antenna input signal magnitudes, the vertical synchronizing pulses will always drive transistor 16 into saturation because of the mutual dependence of automatic gain control voltage and the synchronizing pulse amplitude. That is, a small antenna input signal will be seen to develop a small AGC voltage which, in turn, reduces the current requirements for the vertical synchronizing pulses to drive transistor 16 into saturation. FIG. 2D illustrates the vertical synchronizing pulses developed across transistor 16. The vertical pulse amplitude will be noted to equal the AGC voltage.

As so far described, the construction of FIG. 1 offers numerous advantages in addition to its combination of a plurality of functions in a single stage circuit. Thus, it will be seen that the horizontal synchronizing pulses are blanked at the output of the video demodulator while the black level output is maintained at ground potential via the AGC circuit, independent of the antenna signal amplitude. The video signal may thus be direct current coupled from the demodulator to the cathode of the picture tube employed. Also, should clamping be desired, this black level offers a noise-free reference upon which to clamp. Maintaining the black level at the demodulator output, furthermore, will be seen to prevent the picture tube screen from being driven to an all-white condition during channel changing, or in the absence of antenna signal. The video blanking serves to reduce the signal amplitude by approximately 30 percent so that the dynamic range of the amplifier can be reduced by a corresponding amount.

Improved immunity against aircraft flutter is also provided. Such aircraft flutter which can not be leveled by the automatic gain control circuit is compensated by the automatic black level control of the demodulator. Whenever the antenna signal gets very small, conventional television receivers will periodically go to an all-white condition. With the illustrated circuit, however, black level is maintained and receiver operation is substantially improved. Also, improved separation of the horizontal synchronizing pulses results. Noise performance has been noted to be superior to receivers using a noise inverter stage. Even under poor receiving conditions, an absence of video signal at the output of the horizontal synchronizing separator has been noted. Differentiation of the horizontal synchronizing pulses is no longer needed because of the absence of vertical pulses during the horizontal synchronizing pulse interval. Accurate automatic gain control is further obtained by a simple construction. A fixed setting of the AGC threshold is possible as the flyback pulse amplitude exhibits little influence on the control voltage. The AGC potentiometer can, therefore, be omitted from a receiver configuration.

In addition, the automatic gain control voltage developed remains stable during a horizontal out-of-synchronization condition, so that the automatic gain control does not modulate the picture intermediate frequency signal with a difference frequency formed between the free-running horizontal oscillator and the received horizontal synchronizing pulses. In this non-synchronized condition, the video signal will be short-circuited to ground by transistor 10 for the duration of the horizontal pulses. The emitter electrode of transistor 16 will then clamp both the vertical synchronizing and horizontal synchronizing pulses at ground potential. While most of the resulting current will flow through resistor 22 and only about one-third will flow into capacitor 42, there will be a slight decrease in the AGC voltage developed. Consequently, the intermediate frequency gain will increase and will raise the synchronizing pulse amplitude to the point where it just balances the AGC voltage. Horizontal pulse separation is thus maintained by the keying of the emitter electrode of transistor 16. The AGC voltage is kept almost constant, and there is little ripple on it as would be normal in conventional receiver designs due to the difference in frequency of the keying pulses and the received horizontal synchronizing pulses. This system thus offers a wider pull-in range and a faster response without noticeably degrading the signal-to-noise ratio. The video signal will be seen to be prevented from entering the horizontal pulse separation interval during non-synchronized operation as only the tips of the envelope which are clamped by transistor 16 can produce a charging current in capacitor 42.

Transistor 10 will serve to discharge capacitor 42 via resistor 38 by short-circuiting the positive-going video signal. The leakage current that flows is small and is compensated by the AGC action.

The demodulator also serves to maintain the black level under this non-synchronized state. Transistor 10 is included in the circuit in this respect since its absence would permit the AGC voltage to follow the synchronizing pulse amplitude via the leakage current through resistor 22. The result would be a slight video-dependent error in the horizontal phase caused by the discharge of capacitor 42 via resistor 22 during the black video passages. Inclusion of transistor 10 prevents the horizontal pulses at the output of the synchronizing separator circuit from showing some amplitude modulation.

While there has been described what is considered to be a preferred embodiment of the invention, it will be apparent to those skilled in the art that other modifications may be made without departing from the teachings herein, as set forth in the appended claims.

What is claimed is:

1. The combination comprising:

a semiconductor rectifier having anode and cathode electrodes;

a first transistor having an emitter electrode coupled to a point of reference potential, a collector electrode coupled to the anode electrode of said rectifier, and a base electrode;

signal supply means having a first terminal applying composite video input signals to the cathode electrode of said rectifier to be demodulated thereby, and also having a second terminal;

a first load circuit coupling the anode electrode of said rectifier to the second terminal of said signal supply means;

a second load circuit coupling the second terminal of said signal supply means to said point of reference potential and having an impedance characteristic substantially less than that of said first load circuit; and means for supplying trigger pulses to the base electrode of said first transistor to alter its conductivity state and the effective load impedance presented to said input signals during the horizontal synchronizing pulse interval of said composite video signal;

whereby first output signals are developed at the anode electrode of said rectifier by said first load circuit during the active line interval of said composite signal and whereby second output signals are developed at the cathode electrode of said rectifier by said second load circuit during the horizontal retrace interval of said composite signal.

2. The combination of claim 1 wherein the emitter electrode of said first transistor and said second load circuit are each coupled to a point of ground potential in order that said first output signal at the anode electrode of said rectifier will be clamped to said ground potential during the horizontal retrace interval of said composite video signal.

3. The combination of claim 2 wherein said first transistor is initially biased to a non-conductive condition, and is rendered conductive by positive-going trigger pulses supplied to its base electrode at a time substantially coincident with the horizontal synchronizing pulse interval of said composite video signal.

4. The combination of claim 2 wherein said first load circuit includes a first resistor and a first capacitor coupled in parallel between the anode electrode of said rectifier and the second terminal of said signal supply means.

5. The combination of claim 4 wherein said second load circuit includes a second capacitor and second resistor serially coupled between the second terminal of said signal supply means and said point of ground potential.

6. The combination of claim 5 wherein there is also included a second transistor having a collector electrode coupled to the second terminal of said signal supply means, a base electrode coupled to a point of bias potential, and an emitter electrode coupled to the anode electrode of said semiconductor rectifier.

7. The combination of claim 6 where said second transistor is initially biased to a non-conductive condition, and is rendered conductive by negative-going pulses developed at the anode electrode of said semiconductor rectifier during the vertical synchronizing pulse interval of said composite video signal to develop corresponding vertical synchronizing pulses at the collector electrode of said second transistor when conductive.

* * * * *